(12) United States Patent
Kim et al.

(10) Patent No.: US 8,585,237 B2
(45) Date of Patent: Nov. 19, 2013

(54) LIGHTING MODULE

(75) Inventors: Han Gyoul Kim, Seoul (KR); Young Kuk Kwak, Seoul (KR); Sang Jun Hong, Seoul (KR); Young Sik Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/362,982

(22) Filed: Jan. 31, 2012

(65) Prior Publication Data

US 2012/0127756 A1 May 24, 2012

(30) Foreign Application Priority Data

May 27, 2011 (KR) .................. 10-2011-0050546
May 27, 2011 (KR) .................. 10-2011-0050547

(51) Int. Cl.
*F21S 4/00* (2006.01)

(52) U.S. Cl.
USPC ........ 362/224; 362/246; 362/249.02; 362/612

(58) Field of Classification Search
USPC ............... 40/546, 572; 362/23.07–23.1, 97.3, 362/224, 244–246, 249.02, 612, 616
See application file for complete search history.

(56) References Cited

U.S. PATENT DOCUMENTS

2008/0285274 A1* 11/2008 Jung .............................. 40/546

FOREIGN PATENT DOCUMENTS

| EP | 2312199 A1 | 4/2011 |
|---|---|---|
| WO | 2011004306 A1 | 1/2011 |

OTHER PUBLICATIONS

Europrea Search Report mailed Sep. 5, 2012 for 12155203.8.

* cited by examiner

*Primary Examiner* — Stephen F Husar
(74) *Attorney, Agent, or Firm* — Lowe Hauptman Ham & Berner, LLP (57) ABSTRACT

A lighting module may be provided that includes a first and a second light sources, both of which are disposed opposite to each other; a first case including the first light source; a second case including the second light source; and an optical plate of which one side is connected to the first case and the other side is connected to the second case and on which light from the first and the second light sources is incident, wherein at least the first and/or the second light sources includes a light emitting diode (LED).

18 Claims, 9 Drawing Sheets

LIGHTING MODULE

CROSS-REFERENCE TO RELATED APPLICATION

The present application claims priority under 35 U.S.C. §119(e) of Korean Patent Application No. 10-2011-0050546 filed May 27, 2011, No. 10-2011-0050547 filed May 27, 2011, the subject matters of which are incorporated herein by reference.

BACKGROUND

1. Field

Embodiments may relate to a lighting module.

2. Background

A light emitting diode (LED) is an energy device for converting electric energy into light energy. Compared with an electric bulb, the LED has higher conversion efficiency, lower power consumption and a longer life span. As there advantages are widely known, more and more attentions are now paid to a lighting apparatus using the LED.

The lighting apparatus using the LED are generally classified into a direct lighting apparatus and an indirect lighting apparatus. The direct lighting apparatus emits light emitted from the LED without changing the path of the light. The indirect lighting apparatus emits light emitted from the LED by changing the path of the light through reflecting means and so on. Compared with the direct lighting apparatus, the indirect lighting apparatus mitigates to some degree the intensified light emitted from the LED and protects the eyes of users.

SUMMARY

One embodiment is a lighting module. The lighting module includes: a first and a second light sources, both of which are disposed opposite to each other; a first case including the first light source; a second case including the second light source; and an optical plate of which one side is connected to the first case and the other side is connected to the second case and on which light from the first and the second light sources is incident, wherein at least one of the first and/or the second light sources includes a light emitting diode (LED).

Another embodiment is a lighting module. The lighting module includes: a light source which includes a substrate and a light emitting device disposed on the substrate; a case which includes a base on which the substrate of the light source is disposed and a first and a second extension parts, each of which supports one side and the other side of the substrate respectively; a first plate which is connected to the first extension part of the case and reflects and transmits light from the light emitting device of the light source; and a second plate which is connected to the second extension part of the case and reflects and transmits light from the light emitting device of the light source, wherein the light emitting device includes a light emitting diode (LED).

BRIEF DESCRIPTION OF THE DRAWINGS

Arrangements and embodiments may be described in detail with reference to the following drawings in which like reference numerals refer to like elements and wherein.

DETAILED DESCRIPTION

A thickness or a size of each layer may be magnified, omitted or schematically shown for the purpose of convenience and clearness of description. The size of each component may not necessarily mean its actual size.

It should be understood that when an element is referred to as being 'on' or "under" another element, it may be directly on/under the element, and/or one or more intervening elements may also be present. When an element is referred to as being 'on' or 'under', 'under the element' as well as 'on the element' may be included based on the element.

An embodiment may be described in detail with reference to the accompanying drawings.

Figure 1:
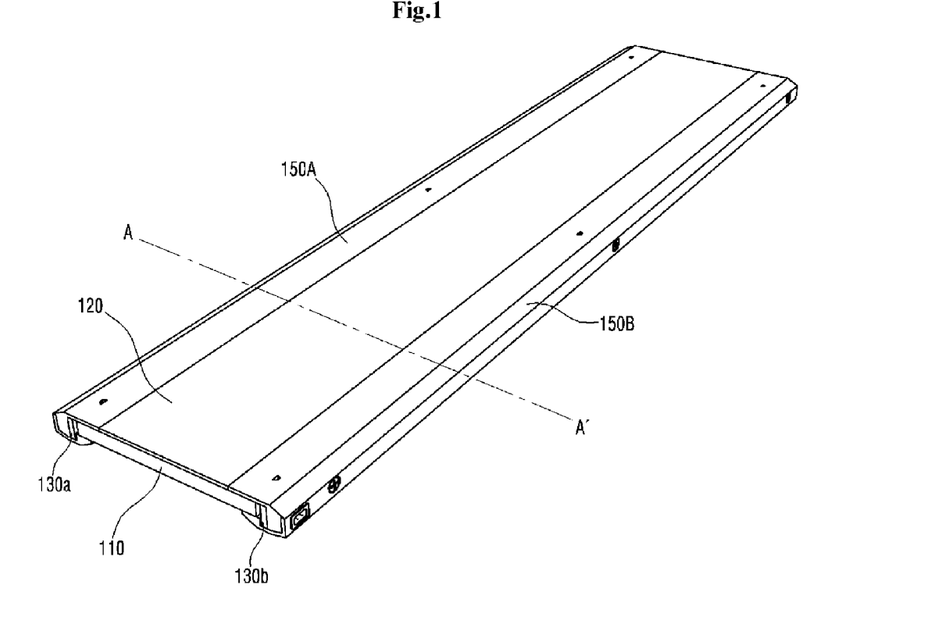
FIG. 1 is a perspective view of a lighting module according to an embodiment.
Figure 2:
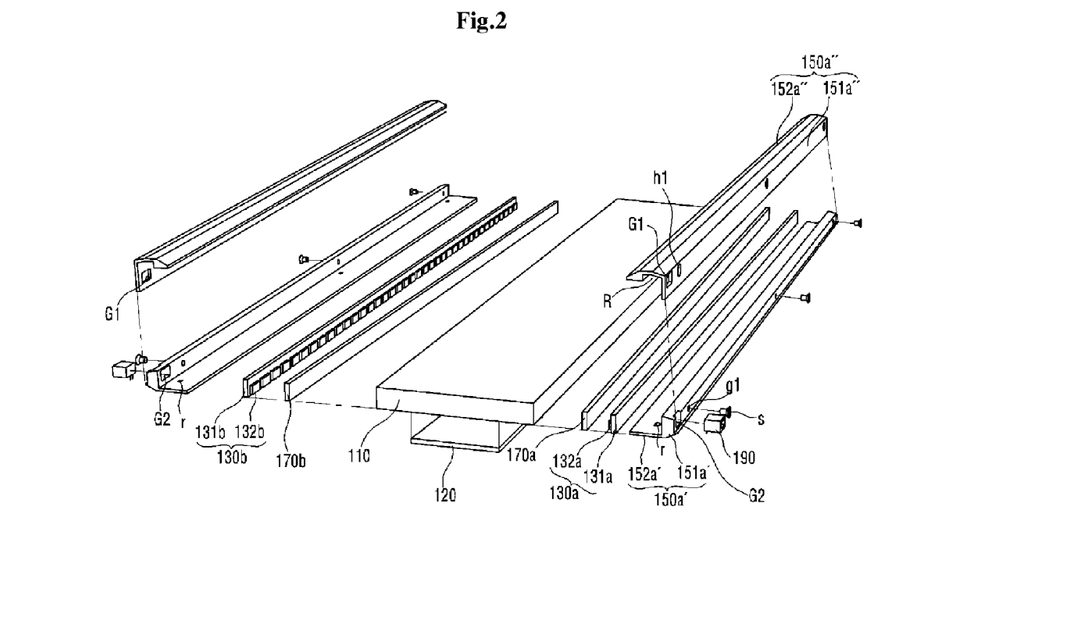
FIG. 2 is an exploded perspective view of the lighting module shown in FIG. 1.
Figure 3:
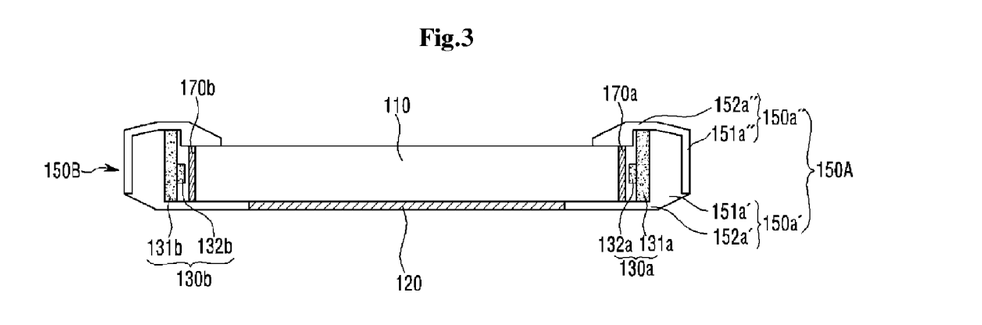
FIG. 3 is a cross sectional view of the lighting module shown in FIG. 1 taken along line A-A'.

FIG. 1 is a perspective view of a lighting module according to an embodiment. FIG. 2 is an exploded perspective view of the lighting module shown in FIG. 1. FIG. 3 is a cross sectional view of the lighting module shown in FIG. 1 taken along line A-A'.

Referring to FIGS. 1 and 3, a lighting module 100 includes a light guide plate 110, an optical plate 120, a first light source 130*a*, a second light source 130*b*, a first case 150A and a second case 150B.

The first case 150A receives the first light source 130*a* and covers one side of the light guide plate 110. The second case 150B receives the second light source 130*b* and covers the other side of the light guide plate 110. Since the second case 150B is the same as the first case 150A, a description of the second case 150B is replaced by a description of the first case 150A.

The first case 150A includes a lower case 150*a*' and an upper case 150*a*". The lower case 150*a*' and the upper case 150*a*" may be coupled to each other by a plurality of screws "S".

The lower case 150a' includes a base 151a' and an extension part 152a'. The first light source 130a is disposed on the inner surface of the base 151a'. The extension part 152a' extends from one side edge of the inner surface of the base 151a' in a direction perpendicular to the inner surface.

The upper case 150a" includes a base 151a" and an extension part 152a". The base 151a' of the lower case 150a' is disposed on the inner surface of the base 151a". The extension part 152a" extends from one side edge of the inner surface of the base 151a" in a direction perpendicular to the inner surface.

Here, the length of the extension part 152a" of the upper case 150a" may be different from the length of the extension part 152a' of the lower case 150a'. For example, the length of the extension part 152a' of the lower case 150a' may be greater than that of the extension part 152a" of the upper case 150a".

The base 151a' of the lower case 150a' may include a groove "g1". The base 151a" of the upper case 150a" may include a hole "h1". The hole "h1" is disposed at a position corresponding to the groove "g1". When the lower case 150a' is coupled to the upper case 150a", the screw "S" passes through the hole "h1" and is inserted into the groove "g1". As a result, the base 151a' of the lower case 150a' is coupled close to the base 151a" of the upper case 150a". The base 151a' of the lower case 150a' includes the groove "g1" instead of the hole in order that the first light source 130a is prevented from being damaged or broken by the screw "S" and from being electrically contacted with the screw "S".

The base 151a' of the lower case 150a' includes a second opening G2. The base 151a" of the upper case 150a" includes a first opening G1. The second opening G2 of the lower case 150a' is disposed at a position corresponding to the first opening G1 of the upper case 150a". Specifically, the second opening G2 and the first opening G1 may be disposed on one side of the first light source 130a. A driving driver 190 is disposed in the second opening G2 of the lower case 150a' and the first opening G1 of the upper case 150a". The driving driver 190 is electrically connected with the first light source 130a and supplies the first light source 130a with electric power from the outside. The driving driver 190 controls the on/off of the first light source 130a.

Though not shown in the drawings, the extension part 152a' of the lower case 150a' may include a groove into which one side of a substrate 131a of the first light source 130a is inserted. The extension part 152a" of the upper case 150a" may include a groove into which the other side of the substrate 131a of the first light source 130a is inserted. Therefore, the first light source 130a can be stably coupled to the first case 150A.

The extension part 152a' of the lower case 150a' may include a receiving groove "r". This will be described with reference to FIG. 4.

Figure 4:
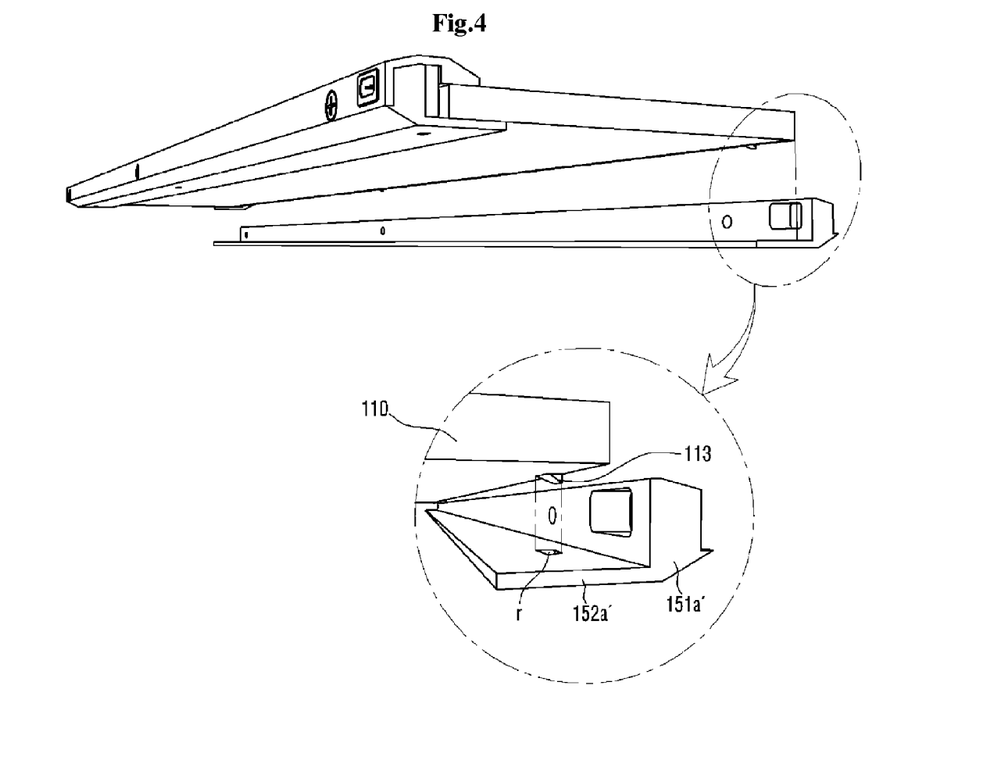
FIG. 4 is an exploded perspective view for describing how the first case shown in FIG. 2 is coupled to the light guide plate shown in FIG. 2.

FIG. 4 is an exploded perspective view for describing how the first case shown in FIG. 2 is coupled to the light guide plate shown in FIG. 2.

Referring to FIG. 4, a projection 113 formed on one side of the light guide plate 110 is inserted into the receiving groove "r". Due to the coupling of the receiving groove "r" and the projection 113, a coupling force between the extension part 152a' of the lower case 150a' and the light guide plate 110 can be strengthened and the light guide plate 110 can be prevented from moving or separating. Here, the projection 113 may be disposed on the other side of the light guide plate 110 and the receiving groove "r" may be disposed in the extension part 152a" of the upper case 150a". The projection 113 may be disposed on both sides of the light guide plate 110 and the receiving groove "r" may be disposed in the lower case 150a' and the upper case 150a".

Referring back to FIGS. 1 to 3, the base 151a' and the extension part 152a' of the lower case 150a' may be independently formed respectively. The lower case 150a' may be also formed by coupling the base 151a' and the extension part 152a'. The base 151a" and the extension part 152a" of the upper case 150a" may be also independently formed respectively. The upper case 150a" may be also formed by coupling the base 151a" and the extension part 152a".

When the first light source 130a is disposed on the inner surface of the base 151a" of the upper case 150a", the extension part 152a' of the lower case 150a' and the extension part 152a" of the upper case 150a" support both sides of the substrate 131a of the first light source 130a respectively.

The upper case 150a" may include a receiving portion "R". The receiving portion "R" receives one side of the first light source 130a and one side of the base 151a' of the lower case 150a'.

The first light source 130a is received in the first case 150A. The first light source 130a is disposed on the inner surface of the base 151a' of the lower case 150a' of the first case 150A.

The first light source 130a includes the substrate 131a and a light emitting device 132a.

A plurality of the light emitting devices 132a are disposed on one surface the substrate 131a. Here, the plurality of the light emitting devices 132a may be disposed in a row or in a plurality of rows.

The other surface of the substrate 131a is disposed on the inner surface of the base 151a' of the lower case 150a' of the first case 150A.

The one side of the substrate 131a is supported by the extension part 152a' of the lower case 150a' of the first case 150A. The other side of the substrate 131a is supported by the extension part 152a" of the upper case 150a" of the first case 150A. Here, the other side of the substrate 131a may be disposed in the receiving portion "R" of the upper case 150a" of the first case 150A.

The substrate 131a may be, for example, a printed circuit board (PCB), a metal core PCB (MCPCB), a flexible PCB (FPCB) and a ceramic substrate.

A plurality of the light emitting devices 132a may emit lights having the same color or may emit lights having mutually different colors. When the plurality of the light emitting devices 132a emit lights the mutually different colors, the lighting module according to the embodiment can emit light having various colors. Accordingly, the lighting module according to the embodiment can create emotional lighting.

The light emitting device 132a may be a blue light emitting device. However, light emitting device 132a may be a white light emitting device having a high color rendering index (CRI), if possible. A synthetic resin including a fluorescent material is molded on a blue light emitting chip, so that the white light emitting device emits white light.

Here, the fluorescent material may include at least one of a garnet based fluorescent material (YAG, TAG), a silicate based fluorescent material, a nitride based fluorescent material and an oxynitride based fluorescent material. While the light emitting device 132a may be formed to emit natural light (white light) by causing the synthetic resins to include only a yellow fluorescent material, the light emitting device 132a may further include a green fluorescent material or a red fluorescent material in order to improve the color rendering index and to reduce the color temperature. When various kinds of the fluorescent materials are mixed in the synthetic resin, the addition ratio of the colors of the fluorescent materials is based on the fact that it is recommended that the green fluorescent material is more used than the red fluorescent material, and the yellow fluorescent material is more used than the green fluorescent material. The yellow fluorescent material may include YAG of the garnet based fluorescent material, a silicate based fluorescent material and an oxynitride based fluorescent material. The red fluorescent material may include a silicate based fluorescent material and an oxynitride based fluorescent material. The red fluorescent material may include a nitride based fluorescent material. The synthetic resin may be mixed with various kinds of the fluorescent materials or may be configured by a layer including the red fluorescent material, a layer including the green fluorescent material and a layer including the yellow fluorescent material, which are formed separately from each other.

The second light source 130b includes a substrate 131b and a light emitting device 132b. Since the arrangement type of the substrate 131b and the light emitting device 132b of the second light source 130b are the same as the arrangement type of the substrate 131a and the light emitting device 132a of the first light source 130a, detailed description thereof will be omitted.

The first light source 130a and the second light source 130b are disposed opposite to each other with the light guide plate 110 placed therebetween. The first light source 130a is disposed on one side of the light guide plate 110. The second light source 130b is disposed on the other side of the light guide plate 110.

The light emitting device 132a of the first light source 130a and the light emitting device 132b of the second light source 130b may have mutually different color temperatures. For example, a plurality of the light emitting devices 132a of the first light source 130a may be warm white LEDs and a plurality of the light emitting devices 132b of the second light source 130b may be cool white LEDs. The warm white LED and the cool white LED emit white light. Since the warm white LED and the cool white LED emit correlated color temperatures respectively and can emit mixed white light, a color rendering index (CRI) which represents how close light is to natural sunlight is improved. As a result, it is possible to prevent an actual color of an object from being distorted and to reduce the fatigue of the eyes of users.

The light guide plate 110 is disposed between the first light source 130a and the second light source 130b both of which are disposed corresponding to each other. Specifically, one side of the light guide plate 110 is disposed corresponding to the first light source 130a. The other side opposite to the one side of the light guide plate 110 is disposed corresponding to the second light source 130b.

The light guide plate 110 receives light through the both sides thereof and emits the light through a top surface thereof and a bottom surface thereof. As such, the light guide plate 110 guides light and changes the path of the light.

The one side of the light guide plate 110 is inserted into the first case 150A. The other side of the light guide plate 110 is inserted into the second case 150B. The one side and the other side of the light guide plate 110 include a portion of the top and the bottom surfaces of the light guide plate 110.

In the top and the bottom surfaces of the light guide plate 110, light is emitted from remaining portions other than portions inserted into the first and the second cases 150A and 150B.

The material of the of the light guide plate 110 may be, for example, polyethylene terephthlate (PET), poly carbonate (PC), cycloolefin copolymer (COC) and polyethylene naphthalate (PEN) and an acrylic resin like polymethyl metaacrylate (PMMA) in consideration of thermal expansion depending on a temperature in use of the material.

The optical plate 120 is disposed on one side of the light guide plate 110. Here, the optical plate 120 may be disposed on the other side of the light guide plate 110. Also, the optical plate 120 may be disposed on both sides of the light guide plate 110.

The optical plate 120 is able to reflect a part of light from the first and the second light sources 130a and 130b and to transmit the rest of the light. Therefore, in the lighting module shown in FIG. 3, it is possible to cause amounts of the lights which are emitted upward and downward from the lighting module to be different from each other. In the lighting module shown in FIG. 3, when the optical plate 120 is not provided, about half of the lights from the light sources 130a and 130b is emitted upward from the lighting module, that is, through the top surface of the light guide plate 110 and the rest of the half the lights is emitted downward from the lighting module, that is, through the bottom surface of the light guide plate 110. Contrary to this, due to the optical plate 120 of the lighting module according to the embodiment shown in FIG. 3, the amount of the light which is emitted upward can be controlled to be more than the amount of the light which is emitted downward.

The optical plate 120 may have a plate shape capable of both reflecting and transmitting light.

The optical plate 120 may be adhered to one side of the light guide plate 110. The optical plate 120 may be also printed on one side of the light guide plate 110 by using semi-light transmitting ink. This case will be described with reference to FIG. 5.

Figure 5:
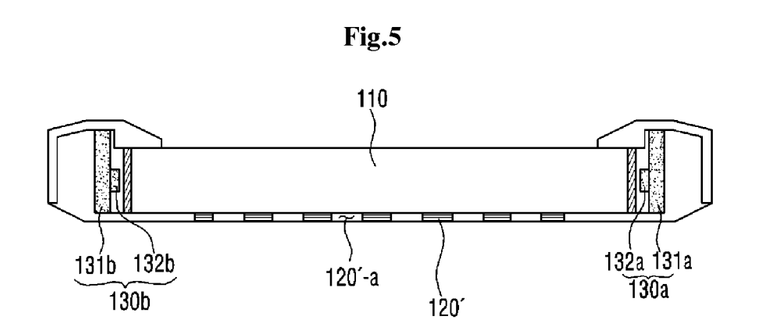
FIG. 5 is a cross sectional view of another embodiment of the lighting module shown in FIG. 3.

FIG. 5 is a cross sectional view of another embodiment of the lighting module shown in FIG. 3.

An optical plate 120' of the lighting module shown in FIG. 5 may be printed on one side of the light guide plate 110 by using the semi-light transmitting ink.

The optical plate 120' may include a plurality of holes 120'-a. This will be described in detail with reference to FIG. 6.

Figure 6:
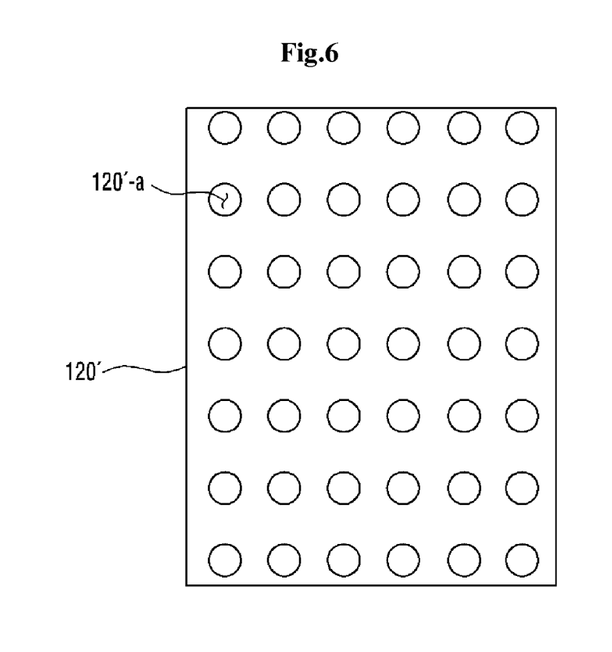
FIG. 6 is a view of the optical plate shown in FIG. 5 as viewed from the bottom.

FIG. 6 is a view of the optical plate shown in FIG. 5 as viewed from the bottom.

Referring to FIGS. 5 and 6, the optical plate 120' include a plurality of holes 120'-a.

The plurality of the holes 120'-a pass through both sides of the optical plate 120'. The plurality of the holes 120'-a are uniformly distributed in the optical plate 120'. For example, the plurality of the holes 120'-a may be arranged in accordance with a predetermined row and column.

Referring to FIG. 5, in lights from the first light source 130a an the second light source 130b, light which is incident on the optical plate 120' is reflected upward, that is, in a direction of the top surface of the light guide plate 110, and light which is incident on the plurality of the holes 120'-a is emitted outward through the plurality of the holes 120'-a. Amounts of the lights which are emitted upward and downward from the lighting module including the optical plate 120' may be different from each other.

Figure 7:
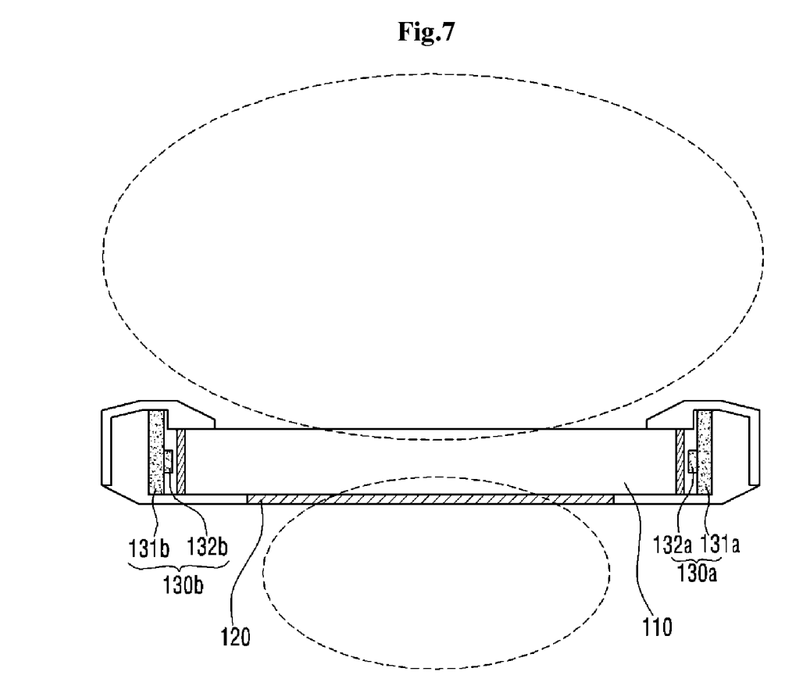
FIG. 7 is a view for describing a light distribution of the lighting module shown in FIG. 3.

FIG. 7 is a view for describing a light distribution of the lighting module shown in FIG. 3.

As shown in FIG. 7, an upper light distribution of the lighting module shown in FIG. 3 is different from a lower light distribution of the lighting module shown in FIG. 3. Specifically, the upper light distribution, that is, a distribution of light which is emitted on the top surface of the light guide plate 110 is wider than the lower light distribution, that is, a distribution of light which is emitted through the bottom surface of the optical plate 120. Here, the upper light distribution and the lower light distribution may show a general Lambertian shape.

It can be expected that the lighting module shown in FIG. 5 has a light distribution similar to that of the lighting module shown in FIG. 7. Here, the upper light distribution and the lower light distribution of the lighting module shown in FIG. 5 may be changed depending on the diameter of the plurality of the holes 120'-*a*. The larger the diameter of the hole 120'-*a* is, the wider the lower light distribution may be. The less diameter of the hole 120'-*a* is, the smaller the lower light distribution may be.

The optical plate 120' shown in FIG. 6 may include embodiments in various shapes. This will be described with reference to FIGS. 8 to 10.

Figure 8:
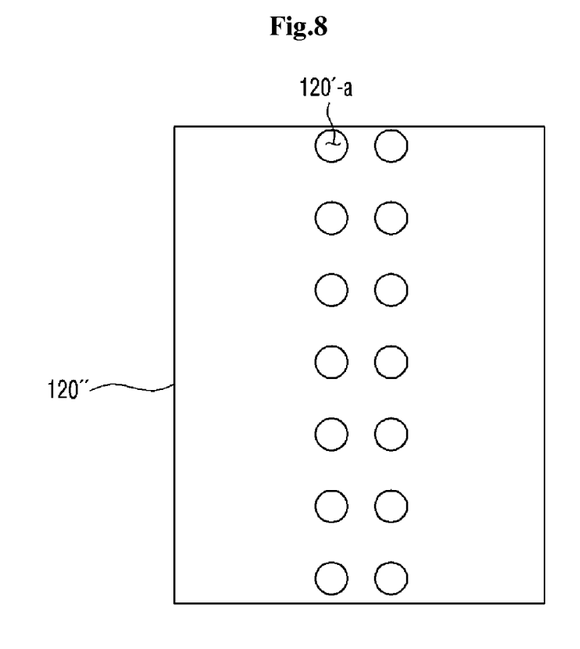
FIGS. 8 to 10 show modified examples of the optical plate shown in FIG. 6.
Figure 9:
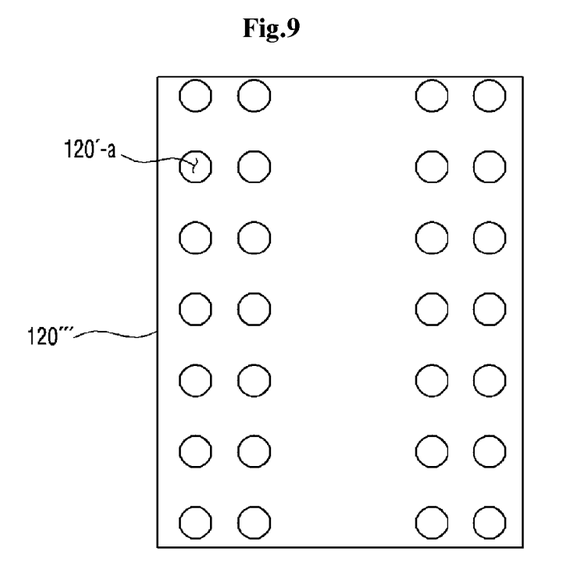
Figure 10:
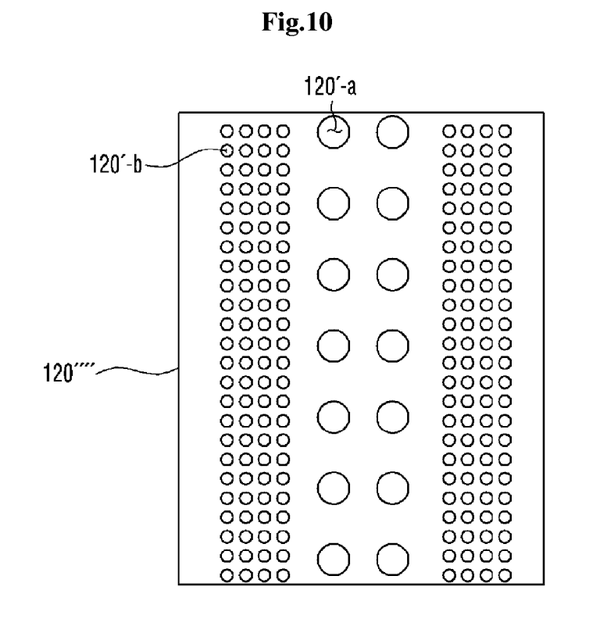

FIGS. 8 to 10 show modified examples of the optical plate shown in FIG. 6.

An optical plate 120" shown in FIG. 8, like the optical plate 120' shown in FIG. 6, includes the plurality of the holes 120'-*a*. However, unlike the optical plate 120' shown in FIG. 6, the optical plate 120" shown in FIG. 8 includes the plurality of the holes 120'-*a* which are actually disposed in the central portion of the optical plate 120".

An optical plate 120'" shown in FIG. 9, like the optical plate 120' shown in FIG. 6, includes the plurality of the holes 120'-*a*. However, unlike the optical plate 120' shown in FIG. 6, the optical plate 120'" shown in FIG. 9 includes the plurality of the holes 120'-*a* which are actually disposed in the outer portion of the optical plate 120'".

An optical plate 120"" shown in FIG. 10, like the optical plate 120' shown in FIG. 6, includes the plurality of the holes 120'-*a*. Moreover, the optical plate 120"" shown in FIG. 10 includes a plurality of auxiliary holes 120'-*b*. The diameter of the auxiliary hole 120'-*b* is less than that of the hole 120'-*a*. The plurality of the holes 120'-*a* are actually disposed in the central portion of the optical plate 120"". The plurality of the auxiliary holes 120'-*b* are actually disposed in the outer portion of the optical plate 120"". The number of the auxiliary holes 120'-*b* may be greater than that of the holes 120'-*a*. Besides, the size of the auxiliary holes 120'-*b* may be smaller than that of the holes 120'-*a*.

A light distribution of the lighting module including the optical plate shown in FIGS. 8 to 10 will be described with reference to FIG. 7.

The upper light distribution and the lower light distribution of the lighting module including the optical plate 120" shown in FIG. 8 may have a bet-wing shape and a spot shape respectively.

The upper light distribution and the lower light distribution of the lighting module including the optical plate 120'" shown in FIG. 9 may have a Lambertian shape and a bet-wing shape respectively.

The upper light distribution and the lower light distribution of the lighting module including the optical plate 120""shown in FIG. 10 may have a shape similar to that of FIG. 7.

As such, through various embodiments of the optical plate, those skilled in the art are able to implement the lighting module including various shaped upper and lower light distributions Referring back to FIGS. 1 to 3, the light guide plate 110 may include a predetermined pattern. This will be described in detail with reference to FIGS. 11 to 12.

Figure 11:
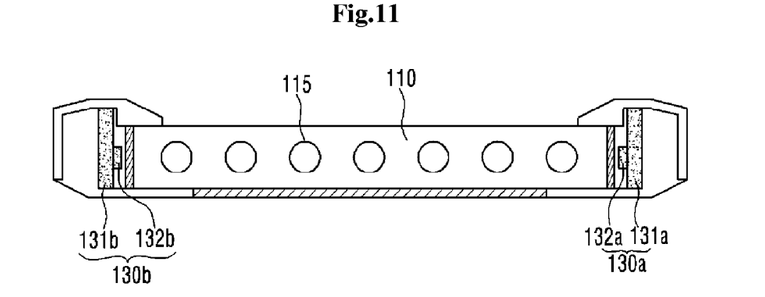
FIG. 11 is a cross sectional view of further another embodiment of the lighting module shown in FIG. 3.
Figure 12:
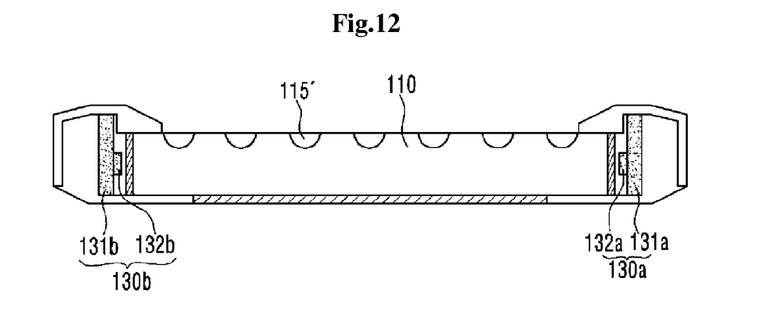
FIG. 12 is a cross sectional view of still another embodiment of the lighting module shown in FIG. 3.

FIG. 11 is a cross sectional view of further another embodiment of the lighting module shown in FIG. 3. FIG. 12 is a cross sectional view of still another embodiment of the lighting module shown in FIG. 3.

Referring to FIG. 11, the light guide plate 110 may include a predetermined pattern 115 therewithin. The predetermined pattern may be disposed within the light guide plate 110, particularly, in a central portion of the light guide plate 110 in a row.

The predetermined pattern 115 may be formed within the light guide plate 110 by using a laser processing method. The predetermined pattern 115 may have a shape with an empty interior.

The predetermined pattern 115 changes the path of light from the first light source 130*a* and the second light source 130*b* and allows the light to be emitted through both surfaces of the light guide plate 110.

A plurality of the predetermined patterns 115 may be provided.

The plurality of the patterns 115 may have the same type and may be disposed within the light guide plate 110 in a row. Particularly, the plurality of the patterns 115 may be disposed in an inner central portion of the light guide plate 110 in a row. In this case, the light from the first light source 130*a* and the second light source 130*b* may be emitted through the top and the bottom surfaces of the light guide plate 110 at the same ratio.

The plurality of the patterns 115 may be disposed closer to one of the top and the bottom surfaces of the light guide plate 110. When the plurality of the patterns 115 are disposed closer to one of the top and the bottom surfaces, an amount of the light which is emitted through the top surface of the light guide plate 110 may be controlled to be different from an amount of the light which is emitted through the bottom surface.

The cross section of the predetermined pattern 115 may have a circular shape. Moreover, the predetermined pattern 115 may have various shapes. For example, the cross section of the predetermined pattern 115 may have an elliptical shape or a slot shape. The cross section of the predetermined pattern 115 may also have a shape formed through a combination of a circle and an ellipse. That is, the upper portion of the shape may be elliptical and the lower portion of the shape may be circular. It is possible to cause the amounts of the lights which are emitted through the top and the bottom surfaces of the light guide plate 110 to be different from each other through the pattern 115.

An interval between the predetermined patterns 115 may be regular or may not be regular. Specifically, the density of the pattern 115 may become greater the closer it is to a central portion from both sides of the light guide plate 110. In other words, an interval between the adjacent patterns 115 may become less the closer it is to the central portion of the light guide plate 110. A lighting module having such a pattern 115 is able to obtain various light distributions.

Referring to FIG. 12, the light guide plate 110 may have a predetermined pattern 115'. The predetermined pattern 115' may be disposed on one of the top surface and the bottom surface of the light guide plate 110.

The predetermined pattern 115' may have a hemispherical cross section. Moreover, the predetermined pattern 115' may have various shaped cross sections. For example, the cross section of the predetermined pattern 115' may have a semi-elliptical shape or a half slot shape.

An interval between the predetermined patterns 115' may be regular or may not be regular. Specifically, the density of the pattern 115' may become greater the closer it is to a central portion from both sides of the light guide plate 110. In other words, an interval between the adjacent patterns 115' may become less the closer it is to the central portion of the light guide plate 110. A lighting module having such a pattern 115' is able to obtain various light distributions.

Referring back to FIGS. 1 to 3, the lighting module according to the embodiment may further include a first phosphor luminescent film 170a and a second phosphor luminescent film 170b.

The first phosphor luminescent film 170a is disposed between the light guide plate 110 and the first light source 130a. The second phosphor luminescent film 170b is disposed between the light guide plate 110 and the second light source 130b.

The first and the second phosphor luminescent films 170a and 170b may emit light with a wavelength different from that of the light emitted from the first and the second light sources 130a and 130b.

The first and the second phosphor luminescent films 170a and 170b may include a transparent resin and a fluorescent material contained within the transparent resin. The fluorescent material of the first phosphor luminescent film 170a may be the same as or different from the fluorescent material of the second phosphor luminescent film 170b. The fluorescent material is excited by the light from the first and the second light sources 130a and 130b and is able to emit light with a wavelength different from that of the light from the first and the second light sources 130a and 130b. The fluorescent material may be at least one of a yellow fluorescent material, a red fluorescent material and a green fluorescent material.

A curing agent or an additive may be included within the transparent resins of the first and the second phosphor luminescent films 170a and 170b. The curing agent cures the transparent resin. The additive uniformly disperses the fluorescent material within the transparent resin. The transparent resin may include a diffusion material. The diffusion material is able to improve an excitation ratio of the fluorescent material by improving the refraction of light.

Though not shown in the drawings, the lighting module according to the embodiment may further include a diffuser plate. The diffuser plate diffuses light which is emitted from the light guide plate 110. Through use of the diffuser plate, light spot can be removed. In this case, the diffuser plate is disposed on at least one of the top and the bottom surfaces of the light guide plate 110. Both sides of the diffuser plate may be inserted into the first case 150A and the second case 150B respectively.

Figure 13:
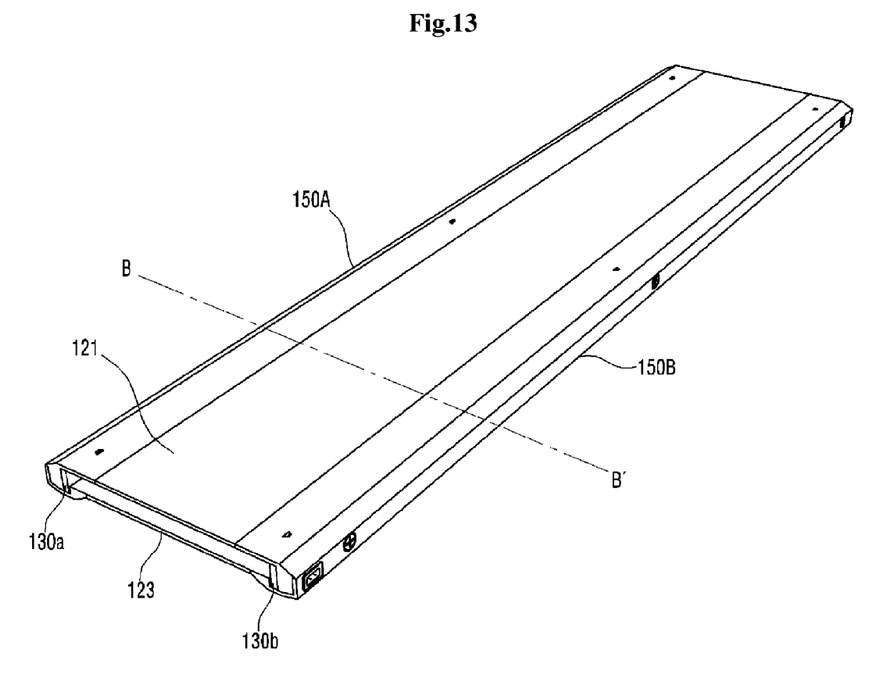
FIG. 13 is a perspective view of a lighting module according to an embodiment.
Figure 14:
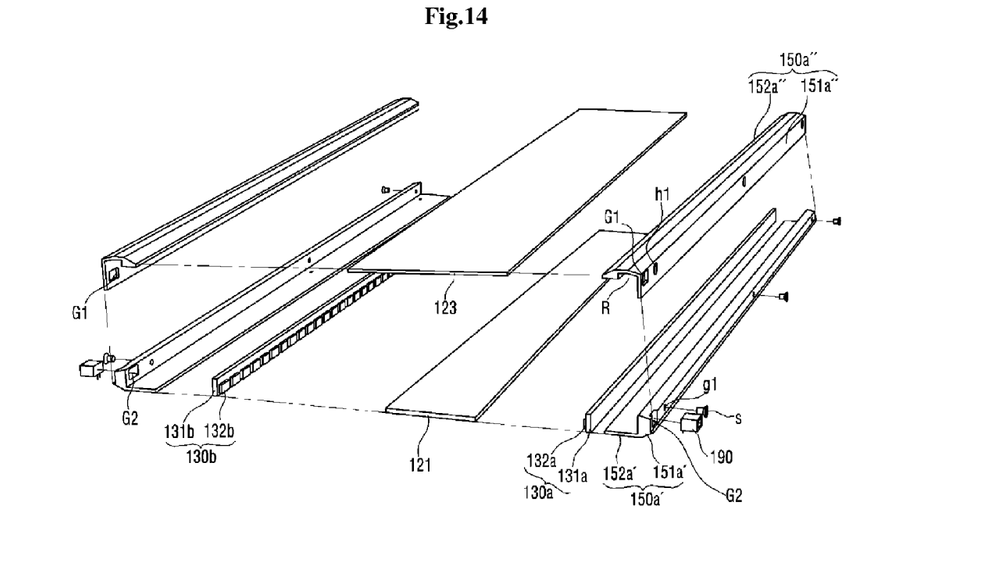
FIG. 14 is an exploded perspective view of the lighting module shown in FIG. 13.
Figure 15:
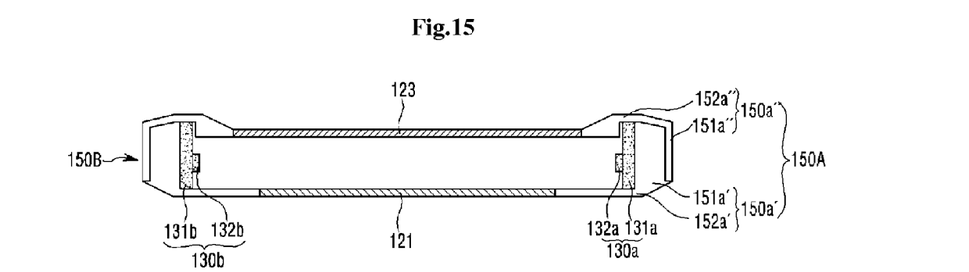
FIG. 15 is a cross sectional view of the lighting module shown in FIG. 13 taken along line B-B'.

FIG. 13 is a perspective view of a lighting module according to an embodiment. FIG. 14 is an exploded perspective view of the lighting module shown in FIG. 13. FIG. 15 is a cross sectional view of the lighting module shown in FIG. 13 taken along line B-B'.

In description of elements of the lighting modules shown in FIGS. 13 to 15, the same reference numerals as those of the lighting modules shown in FIGS. 1 to 3 are assigned to the same elements as those of the lighting modules shown in FIGS. 1 to 3.

Referring to FIGS. 13 to 15, the lighting module according to the embodiment includes a first optical plate 121, a second optical plate 123, a first light source 130a, a second light source 130b, a first case 150A and a second case 150B.

The lighting module shown in FIGS. 13 to 15 does not include the light guide plate 110 of the lighting module shown in FIGS. 1 to 3. The lighting module shown in FIGS. 13 to 15 includes the first and the second optical plates 121 and 123.

Description of the first light source 130a, the second light source 130b, the first case 150A and the second case 150B of the lighting module shown in FIGS. 13 to 15 are replaced by the description of FIGS. 1 to 3. Hereafter, the lighting module shown in FIGS. 13 to 15 will be described focusing on the first and the second optical plates 121 and 123.

The first and the second optical plates 121 and 123 reflect a part of light from the first and the second light sources 130a and 130b and transmit the rest of the light.

The first and the second optical plates 121 and 123 may be plates having a predetermined reflectance and transmittance. The reflectance and the transmittance of the first and the second optical plates 121 and 123 may be equal or not equal to each other. When the reflectance and the transmittance of the first and the second optical plates 121 and 123 are equal to each other, the amount of light which is emitted downward from the first optical plate 121 is almost the same as the amount of light which is emitted upward from the second optical plate 123. When the reflectance and the transmittance of the first and the second optical plates 121 and 123 are not equal to each other, the amount of light which is emitted downward from the first optical plate 121 is different from the amount of light which is emitted upward from the second optical plate 123.

The first and the second optical plates 121 and 123 may be connected to the first and the second cases 150A and 150B. Specifically, one side of the first optical plate 121 may be connected to an extension part 152a' of the lower case 150a' of the first case 150A. The other side of the first optical plate 121 may be connected to an extension part of the lower case of the second case 150B. One side of the second optical plate 123 may be connected to an extension part 152a" of the upper case 150a" of the first case 150A. The other side of the second optical plate 123 may be connected to an extension part of the upper case 150a" of the second case 150B.

The first and the second optical plates 121 and 123 are disposed separately from and opposite to each other.

The first and the second optical plates 121 and 123 may have holes. The light from the first and the second light sources 130a and 130b is emitted outward through the holes. This will be described in detail with reference to FIG. 16.

Figure 16:
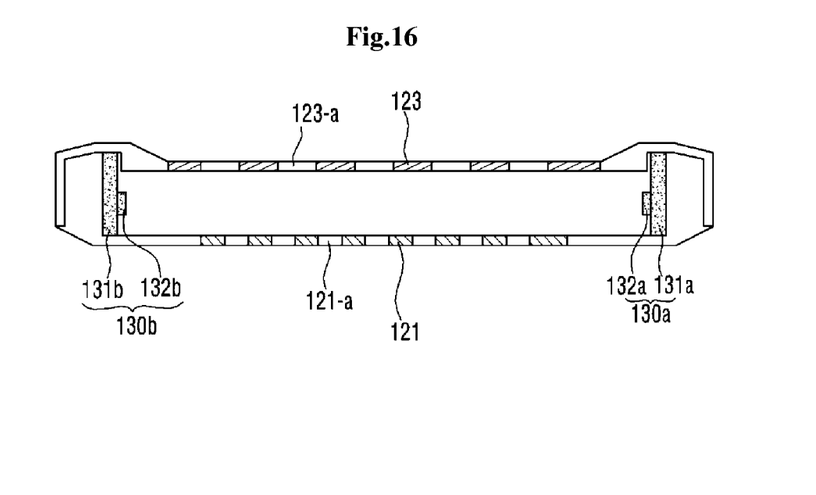
FIG. 16 is a cross sectional view of another embodiment of the lighting module shown in FIG. 15.

FIG. 16 is a cross sectional view of another embodiment of the lighting module shown in FIG. 15.

As shown in FIG. 16, the first optical plate 121 includes a plurality of holes 121-a and the second optical plate 123 includes a plurality of holes 123-a.

Light passes through the holes 121-a and 123-a of the first and the second optical plates 121 and 123. The inner surfaces of the first and the second optical plates 121 and 123 reflect the light.

The shape or the size of the hole 121-a of the first optical plate 121 may be the same as or different from the shape and the size of the hole 123-a of the second optical plate 123. When the hole 121-a of the first optical plate 121 is the same as the hole 123-a of the second optical plate 123, an amount of light which is emitted downward from the first optical plate 121 is almost the same as an amount of light which is emitted upward from the second optical plate 123. Contrary to this, as shown in FIG. 16, when the hole 121-a of the first optical plate 121 is different from the hole 123-a of the second optical plate 123, the amount of light which is emitted downward from the first optical plate 121 is different from the amount of light which is emitted upward from the second optical plate 123. An example where the hole 121-a of the first optical plate 121 is different from the hole 123-a of the second optical plate 123 will be described with reference to FIGS. 17 to 18.

Figure 17:
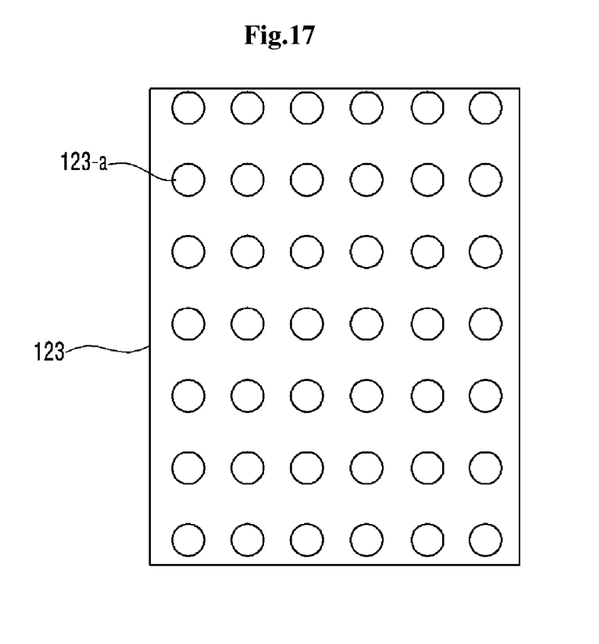
FIG. 17 is a front view of a second optical plate shown in FIG. 16 as viewed from the top.
Figure 18:
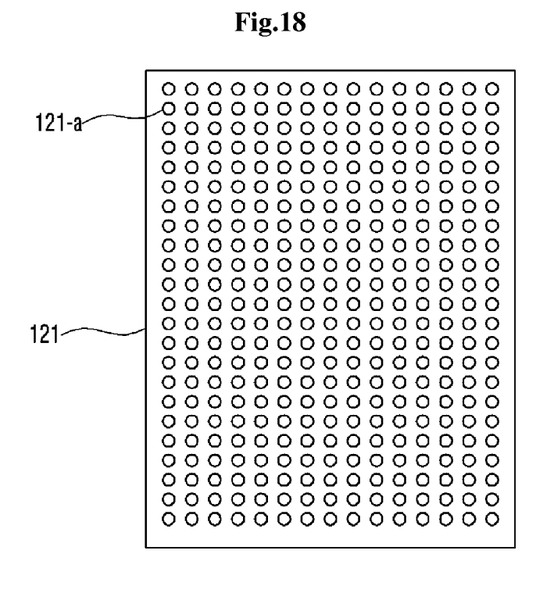
FIG. 18 is a front view of a first optical plate shown in FIG. 16 as viewed from the bottom.

FIG. 17 is a front view of the second optical plate shown in FIG. 16 as viewed from the top. FIG. 18 is a front view of the first optical plate shown in FIG. 16 as viewed from the bottom.

Referring to FIGS. 17 and 18, the hole 121-*a* of the first optical plate 121 may pass through the first optical plate 121. A plurality of the holes 121-*a* are provided and may be uniformly distributed. The hole 123-*a* of the second optical plate 123 may pass through the second optical plate 123. A plurality of the holes 123-*a* are provided and may be uniformly distributed.

The size of the hole 121-*a* of the first optical plate 121 is smaller than the size of the hole 123-*a* of the second optical plate 123. Like this, when the size of the hole 121-*a* of the first optical plate 121 is different from the size of the hole 123-*a* of the second optical plate 123, an amount of light which is emitted through the hole 121-*a* of the first optical plate 121 may be different from an amount of light which is emitted through the hole 123-*a* of the second optical plate 123.

The first and the second optical plates 121 and 123 include a plurality of the holes 121-*a* and a plurality of the holes 123-*a* respectively. A disposition density of the holes 121-*a* of the first optical plate 121 may be different from a disposition density of the holes 123-*a* of the second optical plate 123.

It is shown in FIGS. 17 and 18 that the hole 121-*a* of the first optical plate 121 and the hole 123-*a* of the second optical plate 123 have a circular shape. However, there is no limit to the shapes of the hole 121-*a* and the hole 123-*a*. The hole 121-*a* of the first optical plate 121 and the hole 123-*a* of the second optical plate 123 may have various shapes such as an elliptical shape, a polygonal shape or a slot shape.

Meanwhile, the hole 121-*a* of the first optical plate 121 and the hole 123-*a* of the second optical plate 123 may be disposed only on one of the first optical plate 121 or the second optical plate 123.

Figure 19:
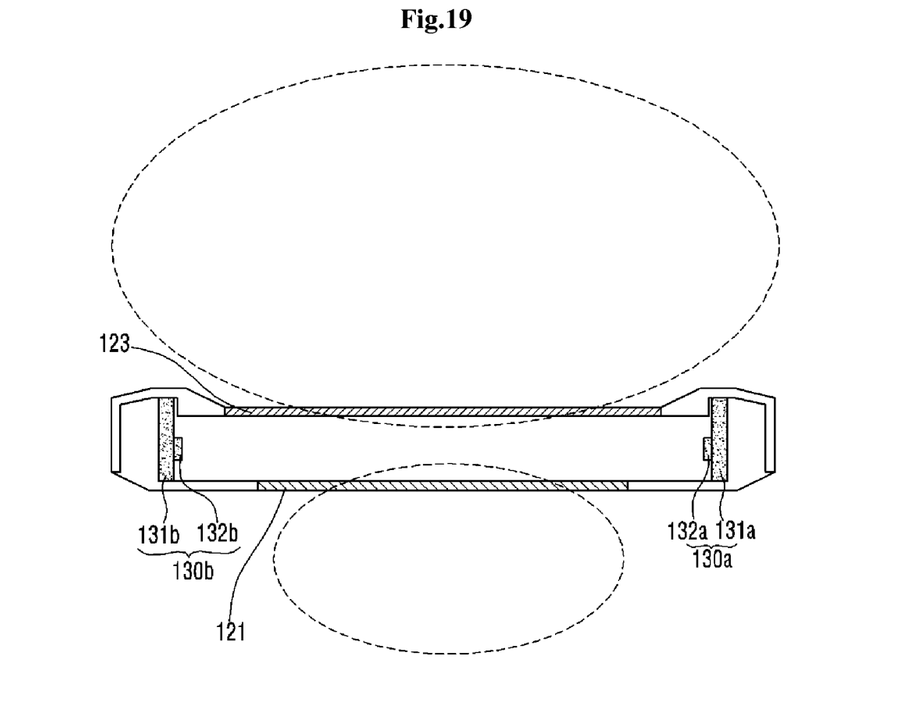
FIG. 19 is a view showing a light distribution of the lighting module shown in FIG. 15.

FIG. 19 is a view showing a light distribution of the lighting module shown in FIG. 15.

The light distribution shown in FIG. 19 may be obtained when a ratio of a reflectance to a transmittance of the first optical plate 121 is different from a ratio of a reflectance to a transmittance of the second optical plate 123.

The light distribution shown in FIG. 19 may be obtained when the reflectance of the first optical plate 121 is greater than that of the second optical plate 123 or when the transmittance of the first optical plate 121 is less than that of the second optical plate 123.

Referring to FIG. 19, it can be found that the upper light distribution of the lighting module shown in FIG. 15 is different from the lower light distribution of the lighting module shown in FIG. 15. Specifically, it can be seen that an amount of light which is emitted through the second optical plate 123 is more than an amount of light which is emitted through the first optical plate 121 and it can also be seen that a distribution of light which is emitted through the second optical plate 123 is wider than a distribution of light which is emitted through the first optical plate 121.

It can be expected that the lighting module shown in FIG. 16 also has a light distribution similar to the light distribution shown in FIG. 19.

Referring back to FIGS. 13 to 15, the first and the second optical plates 121 and 123 of the lighting module according to the embodiment may emit excited light caused by light incident thereon. The first and the second optical plates 121 and 123 are able to emit excited light having a wavelength different from that of light emitted from the first and the second light sources 130*a* and 130*b*. Due to the light from the first and the second light sources 130*a* and 130*b* and the excited light, the lighting module according to the embodiment is able to emit light having various color senses.

The first and the second optical plates 121 and 123 may include a transparent resin and a fluorescent material contained within the transparent resin. The fluorescent material of the first optical plate 121 may be the same as or different from the fluorescent material of the second optical plate 123.

Meanwhile, a curing agent or an additive may be included within the transparent resins of the first and the second optical plates 121 and 123. The curing agent cures the transparent resin. The additive uniformly disperses the fluorescent material within the transparent resin. The transparent resin may include a diffusion agent. The diffusion agent is able to improve an excitation ratio of the fluorescent material by improving the refraction of light.

The first and the second optical plates 121 and 123 may include a diffusing material diffusing light which is incident. When the first and the second optical plates 121 and 123 include the diffusing material, spots of the first and the second light sources 130*a* and 130*b* can be removed. Here, a diffusion function may be included in at least one of the first and the second optical plates 121 and 123.

The following Table 1 shows a practical specification of the lighting modules according to the embodiment shown in FIGS. 1 and 13.

TABLE 1

| Product | Item | | Value | |
| --- | --- | --- | --- | --- |
| Strip Spec. (13S * 5P) | Voltage(V) | | 39 | |
| | Current(mA) | | 350 | |
| | Power(W) | | 13.65 | |
| Module Spec. | Total Lumen output(lm) | Up Lumen Output | 2,500 | 500 |
| | | Down Lumen Output | | 2,000 |
| | Module Power(W) | | 27.3 | |
| | Efficacy(lm/W) | | 90 | |
| | CCT(K) | | 4,000 | |
| | CRI | | 80 | |
| Fixture Spec. | Lumen Output(lm) | | 10,000(Up-Down: 2,000-8,000) | |
| | DC Power Consumption(W) | | 110 | |

Referring to Table 1, in the lighting modules shown in FIGS. 2 and 14, an up lumen output is less than a down lumen output. Contrary to this, the up lumen output may be greater than the down lumen output. For example, a ratio of the down lumen output to the up lumen output maybe from 4:6 to 2:8.

A value of width W (mm)×height H (mm)×length L (mm) of the lighting modules shown in FIGS. 1 and 13 may be either 80×12×560 or 45×12×560.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting module, comprising:
   a first and a second light sources, which are disposed opposite to each other;
   a first case including the first light source;
   a second case including the second light source; and
   an optical plate of which one side is connected to the first case and the other side is connected to the second case and on which light from the first and the second light sources is incident,
   wherein at least one of the first and the second light sources includes a light emitting diode (LED),
   wherein the optical plate comprises a first optical plate and a second optical plate,
   wherein the first and the second optical plates are disposed opposite to each other, and
   wherein a reflectance of the first optical plate is different from a reflectance of the second optical plate.

2. The lighting module of claim 1, wherein at least one of the first and the second optical plates comprises a hole.

3. The lighting module of claim 1, wherein each of the first optical plate and the second optical plate comprises a hole, and wherein the hole of the first optical plate is different from the hole of the second optical plate.

4. The lighting module of claim 1, wherein each of the first optical plate and the second optical plate comprises a plurality of holes, and wherein a density of the holes of the first optical plate is different from a density of the holes of the second optical plate.

5. The lighting module of claim 1, wherein at least one of the first and the second optical plates is configured to emit light with a wavelength different from that of the light from the first and the second light sources.

6. The lighting module of claim 1, wherein at least one of the first and the second optical plates comprises a diffusing material configured to diffuse light from the first and the second light sources.

7. The lighting module of claim 1, wherein the optical plate comprises a plurality of holes and wherein the plurality of the holes are disposed in at least one of a central portion and an outer portion of the optical plate.

8. The lighting module of claim 1, wherein the optical plate comprises a plurality of holes and a plurality of auxiliary holes which are smaller than the holes, and wherein the holes are disposed in a central portion of the optical plate and the auxiliary holes are disposed in an outer portion of the optical plate.

9. The lighting module of claim 1,
   wherein each of the first and second cases comprises:
      a lower case including a base and an extension part extended from one side edge of the base of the lower case; and
      a upper case including a base and an extension part extended from one side edge of the base of the upper case,
   wherein the base of the lower case is disposed on the base of the upper case,
   wherein one side of the first optical plate is connected to the extension part of the lower case of the first case, the other side of the first optical plate is connected to the extension part of the lower case of the second case, and
   wherein one side of the second optical plate is connected to the extension part of the upper case of the first case, the other side of the second optical plate is connected to the extension part of the upper case of the second case.

10. The lighting module of claim 9, wherein, in each of the first and second cases,
    the extension part of the lower case extends from the one side edge of an inner surface of the base of the lower case in a direction perpendicular to the inner surface of the base of the lower case,
    the extension part of the upper case extends from the one side edge of an inner surface of the base of the upper case in a direction perpendicular to the inner surface of the base of the upper case, and
    a length of the extension part of the upper case is different from a length of the extension part of the lower case.

11. The lighting module of claim 1, wherein a width of the first optical plate is different from a width of the second optical plate.

12. The lighting module of claim 1, wherein at least one of the first optical plate and the second optical plate comprises a transparent resin and a fluorescent material.

13. The lighting module of claim 12, wherein the first optical plate has a first fluorescent material, and the second optical plate has a second fluorescent material, and wherein the first fluorescent material is different from the second fluorescent material.

14. The lighting module of claim 12, wherein the lighting module has a space inside, the space is formed by the first and second cases and the first and second optical plates.

15. The lighting module of claim 14, wherein the first and second light sources are configured to emit light to the space.

16. The lighting module of claim 1,
    wherein a first and a second openings are formed between the first case and the second case,
    wherein the first optical plate is disposed at the first opening, the second optical plate is disposed at the second opening, and
    wherein a width of the first opening is different from a width of the second opening.

17. A lighting module, comprising:
    a first and a second light sources, which are disposed opposite to each other;
    a first case including the first light source;
    a second case including the second light source; and
    an optical plate of which one side is connected to the first case and the other side is connected to the second case and on which light from the first and the second light sources is incident,
    wherein at least one of the first and the second light sources includes a light emitting diode (LED),
    wherein the optical plate comprises a first optical plate and a second optical plate,
    wherein the first and the second optical plates are disposed opposite to each other, and
    wherein a transmittance of the first optical plate is different from a transmittance of the second optical plate.

18. A lighting module, comprising:
    a light source which includes a substrate and a light emitting device disposed on the substrate;
    a case which includes a base on which the substrate of the light source is disposed and a first and a second extension parts, each of which supports one side and the other side of the substrate, respectively;
    a first plate which is connected to the first extension part of the case and configured to reflect and transmit light from the light emitting device of the light source; and
    a second plate which is connected to the second extension part of the case and configured to reflect and transmit light from the light emitting device of the light source, wherein the light emitting device includes a light emitting diode (LED),
wherein the first plate has a first lumen output and the second plate has a second lumen output,
wherein the first lumen output differs from the second lumen output, and
wherein a ratio of the first lumen output to the second lumen output is from 4:6 to 2:8.

* * * * *